L. McMURRAY.
Methods of Making Solder-Wire.

No. 155,744.  Patented Oct. 6, 1874.

Witnesses
Ewell Sick.
Henry R. Elliott

Inventor
Louis McMurray
by atty

UNITED STATES PATENT OFFICE.

LOUIS McMURRAY, OF BALTIMORE, MARYLAND.

IMPROVEMENT IN METHODS OF MAKING SOLDER-WIRE.

Specification forming part of Letters Patent No. 155,744, dated October 6, 1874; application filed May 12, 1874.

*To all whom it may concern:*

Be it known that I, LOUIS MCMURRAY, of the city and county of Baltimore, State of Maryland, have invented certain new and useful Improvements in the Manufacture of Solder-Wire, of which the following is a specification:

This invention is particularly directed to the manufacture of solder-wire, used extensively in soldering caps on cans, and in other connections where a thin narrow continuous strip of solder is required.

My mode of manufacture consists in reducing the solder alloy or compound from which the wire is to be made to the condition of a flat plate or disk of the requisite thickness, then cutting up said disk or plate into a continuous length of solder-cord, and then passing this cord through roller-dies by which it will be compressed and shaped into a finished solder-wire of cylindrical, half-round, or other suitable cross-section.

In carrying my process of manufacture into effect, I employ a rotary cutting mechanism combined with a sliding carriage, on which the solder-disk is mounted so as to be capable of a movement of rotation, said carriage being held up toward the cutting mechanism by means of a weight or its equivalent. The edge of the disk is entered between the cutter-wheels, and the latter cut from the disk a cord very much as a top-cord is cut from a piece of leather. In this operation the solder-disk is by the action of the cutting mechanism caused to rotate on its axis, and in proportion as it is reduced in size the holding-carriage automatically advances toward the cutter and so keeps the disk in proper position to be operated on by the cutter. The cord, after leaving the cutting mechanism, is conducted to rolling-dies, which, if desired, may be geared with the cord-cutting mechanism so as to move at the proper rate of speed to take the solder-cord as fast it comes from the cutter. Between these dies the cord is compressed and shaped into a finished wire, which may then be wound upon a reel, or coiled or otherwise packed for use.

The nature of my invention will be readily understood by reference to the accompanying drawing, in which—

Figure 1:
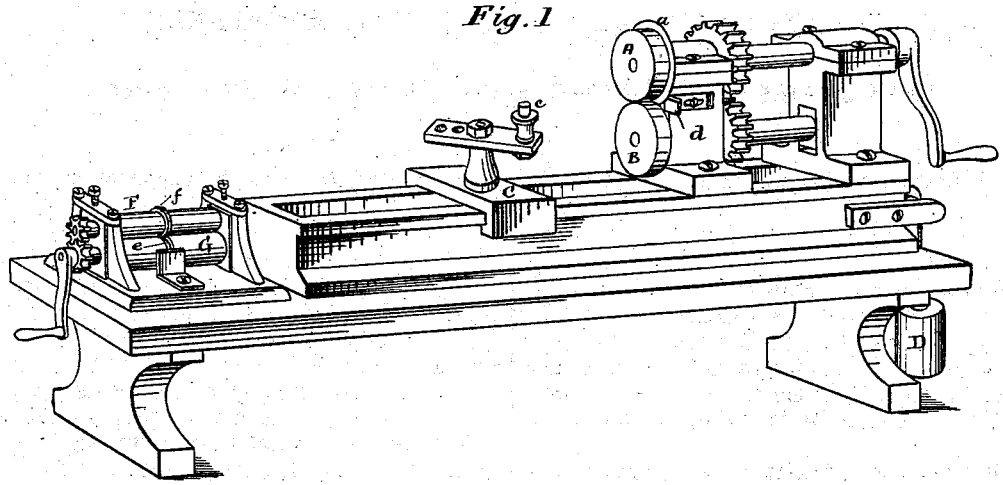
Figure 2:
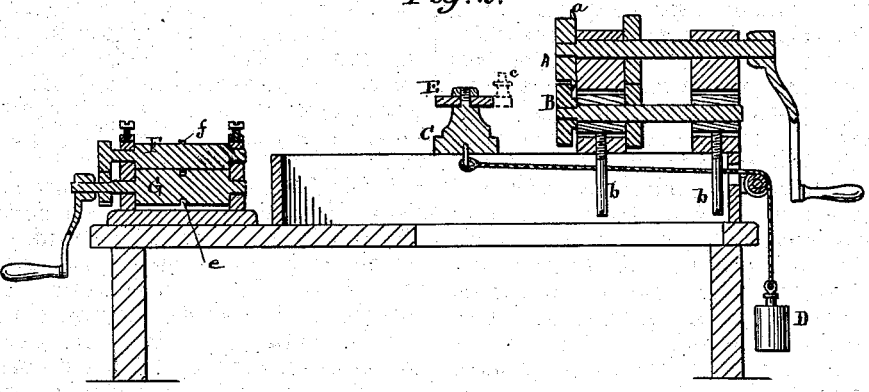

Figure 1 is a perspective view, and Fig. 2 is a longitudinal vertical central section, of one form of mechanism adapted to carry my invention into effect.

The cutting mechanism consists of two wheels, A B, the former having an annular cutter-blade or flange, *a*, adapted to work closely against the rear face of the under wheel, the two wheels thus operating together to cut with a shear-cut any material passing between them. One of the wheels, in this instance B, is made adjustable, so as to be set at different distances from the other, in accordance with the thickness of the object passing between them, this adjustment being effected by pressure and adjusting screws *b* acting against the boxes of its shaft. In rear of the wheels is an adjustable gage, *d*, for determining the width of the cord or strip to be cut. In front of the cutting mechanism is a sliding carriage, C, moving on suitable ways and acted on by a weight, D, or its equivalent, which gives the carriage a tendency to move toward the cutting mechanism. On a post projecting up from the carriage is mounted an arm, E, carrying a pintle or stud, *c*, which serves as the axis for the solder-disk, the latter being perforated at its center to admit of its fitting loosely on said stud. This stud is preferably to one side of a vertical plane passing through the axes of the cutting-wheels. The arm E is confined to the post by a bolt and nut or equivalent means, so that it may be adjusted on said bolt as its axis; and it is perforated with a series of holes, any one of which, according to the necessities of the case, may receive the holding-bolt. In lieu of the arm E and its supporting-post, I can use a sliding holder adapted to move transversely on the carriage and to be clamped in any desired position thereto.

The operation of these devices is as follows: The solder disk or plate is mounted on stud *c*, and the carriage then, by the weight D, is moved up so as to press the periphery of the disk against the gage *d*, in which position a portion of the disk will be entered between the wheels A B. The latter are now put in motion, revolving in the direction of the arrows, Fig. 1, and they draw in between them the solder-disk, the exterior portion of which is severed by the cutters, forming a cord whose thickness is determined by the distance between the gage *d* and the cutters. The disk, by the action of the cutters, is rotated as the cutting progresses, and in proportion as its diameter is reduced it is fed up toward the cutters by the weight, which keeps it pressed against the gage. The cord thus formed is conducted to the rolling-dies, which are shown at F G. The lower roller has a half-round annular groove, *e*, in which enters an annular flange, *f*, on the upper roll, having a concave half-round in its periphery, and the cord passing in this groove and between the two rolls is thus compressed into a cylindrical cross-section. The two die-rollers are provided with pressure and adjusting screws, by which they may be set nearer to or farther from each other.

In a power machine I preferably gear together the cutting mechanism and the compressing and finishing mechanism, so that both shall move in unison. When, however, the machinery is driven by hand, each portion may be actuated independently of the other, and by crank-handles, as shown.

The roller-dies may be provided with removable disks of suitable pattern, as customary in other cases where such rollers are used, in order to compress the wire into any desired shape or cross-section.

I am aware that wire has before been made by first cutting a metallic disk spirally from circumference to center, and then drawing the strips thus produced through draw plates or dies in the manner usually practised in wire-drawing. Such a process of manufacture might answer for the more tenacious metals, such as are used in making the ordinary wire of commerce; but it is useless and practically unavailable for the working of solder, which cannot be subjected to drawing by reason of its lack of tenacity and "rottenness," so called. The finish given to the solder under my invention is the result of squeezing or compression, without subjecting the solder to drawing action or tensile strain.

I do not limit myself to the special mechanical devices herein described, as the same may be varied to a considerable extent without departure from the principle of my invention; but

What I claim, and desire to secure by Letters Patent, is—

The manufacture of solder-wire by cutting up the solder disk or stock into a cord, and then subjecting this cord to compression between roller shaping-dies, substantially as shown and set forth.

In testimony whereof I have hereunto signed my name this 27th day of April, 1874.

LOUIS McMURRAY.

Witnesses:
EWELL DICK,
HENRY R. ELLIOTT.